United States Patent
Gurney et al.

(10) Patent No.: US 7,916,811 B2
(45) Date of Patent: Mar. 29, 2011

(54) METHOD AND APPARATUS FOR IMPROVED BURST ACQUISITION IN A DIGITAL RECEIVER

(75) Inventors: David P. Gurney, Carpentersville, IL (US); Anthony R. Schooler, Bartlett, IL (US); Zhuan Ye, Vernon Hills, IL (US); Richard DiColli, Broomall, PA (US)

(73) Assignee: General Instrument Corporation, Horsham, PA (US)

( * ) Notice: Subject to any disclaimer, the term of this patent is extended or adjusted under 35 U.S.C. 154(b) by 1510 days.

(21) Appl. No.: 10/776,982

(22) Filed: Feb. 11, 2004

(65) Prior Publication Data

US 2005/0175123 A1    Aug. 11, 2005

(51) Int. Cl.
*H04L 27/14* (2006.01)
(52) U.S. Cl. .......... 375/324; 375/340; 375/343
(58) Field of Classification Search ........... 375/324, 375/329, 31, 367, 240.28, 242, 254, 261, 375/283, 365, 322, 340, 343; 371/37.1; 329/311, 329/315, 345, 347; 455/214
See application file for complete search history.

(56) References Cited

U.S. PATENT DOCUMENTS

| | | | |
|---|---|---|---|
| 4,847,869 A * | 7/1989 | Labedz et al. | 375/331 |
| 5,289,476 A * | 2/1994 | Johnson et al. | 714/775 |
| 5,822,384 A * | 10/1998 | Thebault et al. | 375/367 |
| 5,970,399 A * | 10/1999 | Rostamy et al. | 455/222 |
| 6,298,098 B1 | 10/2001 | Krasner et al. | |
| 6,400,928 B1 * | 6/2002 | Khullar et al. | 455/67.11 |
| 6,782,037 B1 * | 8/2004 | Krishnamoorthy et al. | 375/138 |
| 6,850,582 B2 * | 2/2005 | O'Shea et al. | 375/365 |
| 6,975,165 B2 * | 12/2005 | Lopez Villegas et al. | 329/304 |
| 7,095,274 B2 * | 8/2006 | Lopez Villegas et al. | 329/304 |
| 7,130,333 B2 * | 10/2006 | Gibson et al. | 375/150 |
| 7,133,440 B1 * | 11/2006 | Horne et al. | 375/150 |
| 7,272,124 B1 * | 9/2007 | Horne et al. | 370/335 |
| 7,313,204 B2 * | 12/2007 | Yang | 375/322 |
| 7,386,063 B1 * | 6/2008 | Husted | 375/316 |
| 2001/0001008 A1 * | 5/2001 | Dent | 375/271 |
| 2002/0186786 A1 * | 12/2002 | Seo | 375/308 |
| 2004/0097207 A1 * | 5/2004 | Sandaralingam | 455/205 |
| 2005/0084040 A1 * | 4/2005 | Stewart et al. | 375/324 |

* cited by examiner

*Primary Examiner* — Shuwang Liu
*Assistant Examiner* — Helene Tayong
(74) *Attorney, Agent, or Firm* — Larry T. Cullen (57) ABSTRACT

A method for improving burst acquisition in a receiver includes receiving a signal, and performing a sync word search on the signal, wherein the sync word search includes performing a hybrid synchronization technique, the hybrid synchronization technique including both a lower order modulation (e.g., BPSK) detection and correlation process and a higher order modulation (e.g., QPSK) detection and correlation process.

18 Claims, 4 Drawing Sheets

METHOD AND APPARATUS FOR IMPROVED BURST ACQUISITION IN A DIGITAL RECEIVER

FIELD

The present method and system relate to data transfer in a communications system. More particularly, the present method and system provide for improved burst acquisition in a digital receiver.

BACKGROUND

In radio frequency (RF) transmission, multiple bursts of data may be transmitted over a common transmission medium between a plurality of simultaneous users. For practical purposes, a burst of data is equivalent to a packet of data. Each user's transmission may or may not interfere with that of the other users, depending on the transmission protocol that is utilized. A requirement of an effective RF receiver is that the device both successfully demodulate legitimate bursts of data and correctly discard received bursts that contain excessive noise or interference. Bursts containing only noise or interference should also be rejected. Moreover, the receiver should achieve accurate time synchronization for legitimate bursts of information.

Burst or packet data acquisition in digital receivers is often unreliable and expensive to perform, primarily due to the amount of noise and interference that often accompanies a data signal. Burst detection "falses" and "misses" lead to lower data communications throughput and increased packet error rates. A "false" is defined as an event where the digital receiver incorrectly classifies the received signal as a valid data burst when it is not valid, and a "miss" is defined as an event where the digital receiver undesirably misses (or fails to detect) a valid received data burst.

In many communications systems, traditional burst detection methods typically exclusively utilize either a lower modulation order detection (e.g., biphase shift keying or BPSK), or a higher modulation order detection (e.g., quadrature phase shift keying or QPSK) for burst sync word detection. However, using either a lower modulation order (e.g., BPSK) or a higher modulation order (e.g., QPSK) sync word detection method in an attempt to optimize both the miss and false rate performance of the receiver has inherent drawbacks. Typically, one parameter (e.g., the miss rate) must be optimized or improved at the expense of the other parameter (e.g., the false rate). Many traditional receivers also rely on detected signal energy to detect bursts, which is also highly susceptible to noise and interference problems, further negatively impacting packet or bit error rate (PER or BER), and falsing rate performance.

Therefore, a need exists for a high performance and relatively inexpensive method for reducing both the falsing and the miss rates that often contribute to the decreased data throughput and unreliability of communication in traditional digital receivers.

SUMMARY

A method for improving burst acquisition in a receiver includes receiving a signal, and performing a sync word search on the signal, wherein the sync word search includes performing a hybrid synchronization technique, the hybrid synchronization technique including both a lower order modulation (e.g., BPSK) detection and correlation process and a higher order modulation (e.g., QPSK) detection and correlation process.

BRIEF DESCRIPTION OF THE DRAWINGS

The accompanying drawings illustrate various embodiments of the present method and system and are a part of the specification. Together with the following description, the drawings demonstrate and explain the principles of the present method and system. The illustrated embodiments are examples of the present method and system and do not limit the scope thereof.

Throughout the drawings, identical reference numbers designate similar but not necessarily identical elements.

DETAILED DESCRIPTION

The present specification describes a method and a system for improving burst acquisition in a digital receiver. More specifically, the present method and system filters a received signal, qualifies the signal energy, qualifies the signal carrier to interference ratio, and then performs a hybrid sync word search. The hybrid sync word search of the present method and system combines the best performance characteristics of both a lower order demodulation (e.g., differentially detected BPSK modulation) and a higher order demodulation (e.g., coherently detected QPSK modulation) to simultaneously achieve both excellent falsing and miss rate performance. For the purposes of this discussion, a lower order modulation is any modulation that utilizes a smaller signaling alphabet (e.g., fewer constellation points) than a higher order modulation (with a relatively larger signaling alphabet). Most digital communications systems utilize a sync word, or preamble data sequence to aid received signal acquisition. In many of these communications systems, the sync word portion of the data packet is of lower order modulation (e.g., BPSK), and the rest of the data in the packet utilizes a higher order modulation (e.g., QPSK). Other examples of lower and higher order modulation types include (respectively), but are not limited to: BPSK and 16-QAM; BPSK and 64-QAM; QPSK and 16-QAM; QPSK and 64-QAM. Further details of the present method and system will be described hereafter.

In the present specification and in the appended claims, the terms "burst" and "packet" are used interchangeably without any loss of generality. Burst acquisition typically involves the steps of detecting a potential received burst (termed "burst detection") and then validating a received burst. Burst validation is typically performed through burst data demodulation, detection, and a sync word correlation processes. The generic term "demodulation" is often used to lump the data recovery (or detection) and correlation stages together.

Additionally, the term "DBPSK" or "differentially detected biphase shift keying" is meant to be understood broadly, both here and in the appended claims as a digital frequency modulation technique used for sending data over a coaxial cable network or other channel (e.g., wireless communications channels). When compared to other modulation techniques such as QPSK, DBPSK is somewhat less efficient but also less susceptible to noise. Due to the reduced susceptibility to noise of BPSK detection (primarily due to increased decision regions in the slicer, as is known to those skilled in the art), these types of detectors exhibit excellent miss rate performance compared to QPSK detectors (as further described below). Note that DBPSK can also be coherently detected and differentially decoded with no loss of generality. Even coherent BPSK modulation can be differentially decoded as long as the expected data sequence is known. The methods used in the present method and apparatus utilize differential BPSK detection to lower implementation complexity at a slight decrease in performance, though coherent BPSK detectors could be employed to improve performance at a higher implementation cost.

Similarly, the term "CQPSK" or "coherently detected quadrature phase shift keying" is meant to be understood as a digital frequency modulation technique used for sending data over coaxial cable networks. QPSK is fairly resistant to noise and exhibits excellent false rate performance when compared to BPSK. The methods of the described invention utilize coherently detected QPSK modulation techniques, which has a significant performance advantage over differentially detected QPSK modulation techniques. Note that differential detection of differentially encoded QPSK signals could be utilized to lower implementation complexity, at the expense of detector performance, as is known to those skilled in the art.

The term modem "miss rate" is meant to be understood as a frequency of failing to identify a valid packet data transmission by a demodulator. These types of errors are typically caused by data or symbol errors (due to noise or interference) in the sync word portion of the data transmission. Traditionally, missing packets is highly undesirable in a communications system, since it causes the system to initiate a data re-transmission, which requires re-use of limited communications resources. Low miss rates are very desirable in communications modems since they effectively increase the data throughput of the system.

The term "falsing rate" is meant to be understood broadly both here and in the appended claims as referring to a frequency of misidentification of an invalid received signal, such that it is incorrectly classified as a valid received burst. Both noise and interference sources can cause the falsing rate of a modem to increase. Traditionally, falsing in communications modems is highly undesirable, since it consumes limited processing resources that are typically used for demodulating valid bursts, and requires the invalid burst to be detected by other means (e.g., error detection means).

In the following description, for purposes of explanation, numerous specific details are set forth in order to provide a thorough understanding of the present method and system for improving burst acquisition in a digital receiver. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
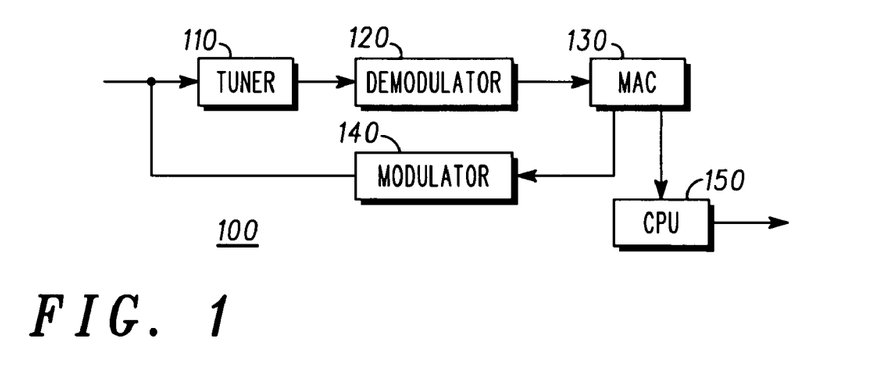
FIG. 1 is a simple block diagram illustrating the components of a receiver according to one exemplary embodiment.

FIG. 1 illustrates an exemplary RF receiver (100) according to one exemplary embodiment. As shown in FIG. 1, an RF receiver (100) may include a tuner (110), a demodulator (120), a media access control (130), a modulator (140), and a central processing unit (150). The RF receiver (100) is configured to receive a burst modulated signal in the tuner (110) and transfer that signal to the burst demodulator (120) where the received signal may be converted into a signal that may be processed digitally (through the use of an analog to digital converter, not shown), the media access control (130), or the central processing unit (150) prior to being transmitted to an external network or display device (not shown). The media access control (130) and processor (150) are primarily responsible for scheduling reception and transmissions on the communications channel. Some typical channel resource scheduling algorithms include random channel access methods (as utilized in the DVS178 cable communications system specification) and a TDMA-based method (as utilized in the DVS167 cable communications system specification). While the present method and system are described in the context of an RF receiver and particular communication systems, the present burst acquisition methods may be incorporated into any digital communication system where a lower order modulation sync word is present with higher order modulation signaling.

Figure 2:
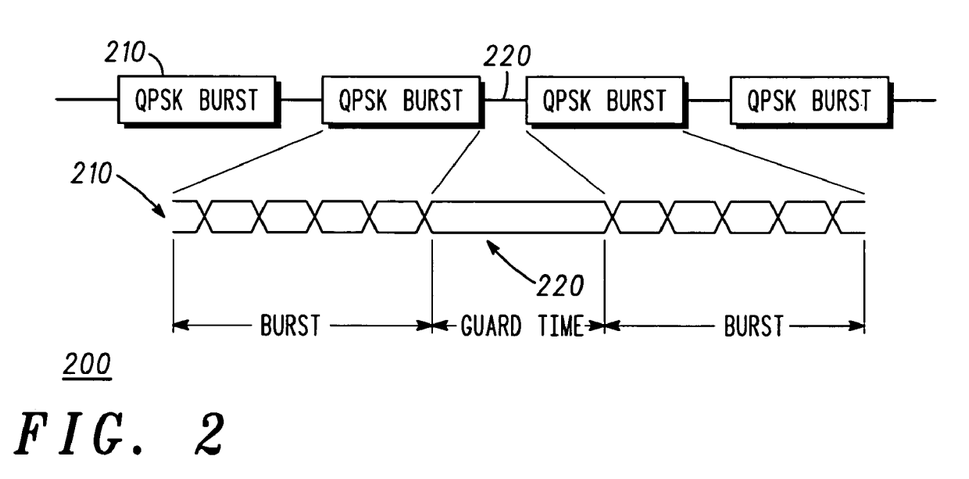
FIG. 2 is a simple block diagram illustrating an RF burst signal according to one exemplary embodiment.
Figure 3:
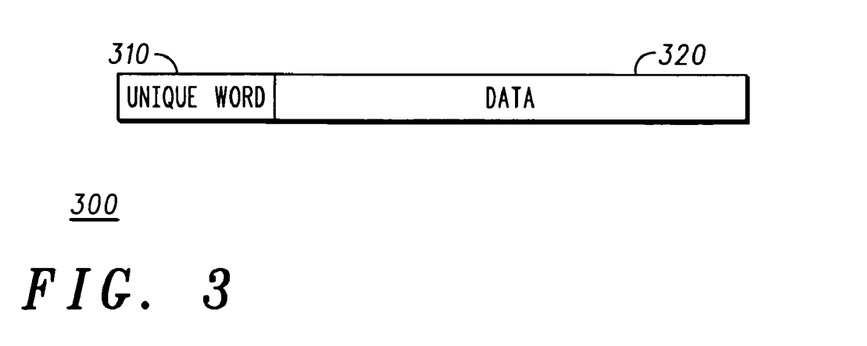
FIG. 3 is a simple block diagram illustrating an RF data format according to one exemplary embodiment.

FIG. 2 illustrates an exemplary burst modulated radio frequency (RF) signal (200) that may be received by the RF receiver (100) of FIG. 1 according to one exemplary embodiment. As illustrated in FIG. 2, a burst modulated RF signal (200) may include a QPSK RF modulated input data stream having a plurality of data bursts (210) separated by a guard time (220). The data bursts may or may not occur at regular or semi-regular intervals. The format of the data containing data bursts (210) is illustrated in FIG. 3. As shown in FIG. 3, the data bursts (300) include a preamble, a sync word or unique word (310), which typically contains fixed data fields for the purposes of signal detection and synchronization, followed by a data packet (320) of user data. The data packet portion of the burst is also referred to as the data payload. The unique word (310) portion of the data bursts (300) is a set of synchronization values, or timing reference signals, that are searched for and accessed by the demodulator (120; FIG. 1) to synchronize the timing of the data demodulation. Symbol timing synchronization is often important for subsequent data descrambling and error correction operations.

Modem false rate and miss performance is critical to good overall receiver (100; FIG. 1) performance. As noted previously, a number of methods, including QPSK or BPSK detection, have been incorporated by demodulators (120; FIG. 1) to help prevent falses and misses from occurring in the demodulator. Once again, a false occurs when a demodulator (120; FIG. 1) mistakenly identifies a received signal having strong noise or interference components as a valid data packet. It is important to note that besides falsely identifying a signal as a data packet, falses may also have other undesirable consequences. According to one exemplary embodiment, one possible effect of a false sync word detect is a packet mis-alignment, if a valid packet was actually transmitted in the temporal vicinity of the falsely detected burst. The falsely detected or misaligned packet causes all nearby data to be corrupted. For example, if a sync word correlator operating in a demodulator (120; FIG. 1) falses before the actual (nearby) sync word (310) is encountered, a condition termed a mis-alignment typically occurs. This condition is somewhat catastrophic, because it causes a number of components in an RF receiver (100) to be out of sync. Consequently, a number of bit errors will typically be found in the packet (usually around 50% of the bits in a packet will be in error since they are effectively scrambled by subsequent de-scrambler operations, which are in-turn also out of sync). This condition may make the receiver's (100; FIG. 1) bit error rate (BER), or percentage of bits that have errors relative to the total number of bits received in a transmission, appear much worse than it actually is.

Not only may falses cause mis-alignments, they can also simultaneously induce misses, since while the receiver (100; FIG. 1) is pre-occupied demodulating and outputting what it thinks is valid data, a true sync word may occur on the channel undetected. Also note that a Reed-Solomon decoder (not shown) may not even detect every errored (invalid) packet, whether it is a mis-alignment or a false on pure noise. Traditional RS decoder simulations have shown this effect to be on the order of $10^{-4}$ (one in every 10,000 packets falsely marked as correctable on average). Thus, a large number of system falses on noise could undesirably produce invalid system messages (if no other error checking is performed).

Similarly, as stated above, a miss occurs when a demodulator (120; FIG. 1) fails to correctly identify a received signal as a valid data burst. A valid data burst can be considered as any data packet that contains useful user data. Misses typically occur when errors (e.g., noise or interference) in the sync word or symbol detection process cause the sync word not to be recognized in the demodulator (120; FIG. 1). Misses can also be considered errors, and typically require data re-transmissions, which lowers system data throughput rates and increases system latency.

Figure 4:
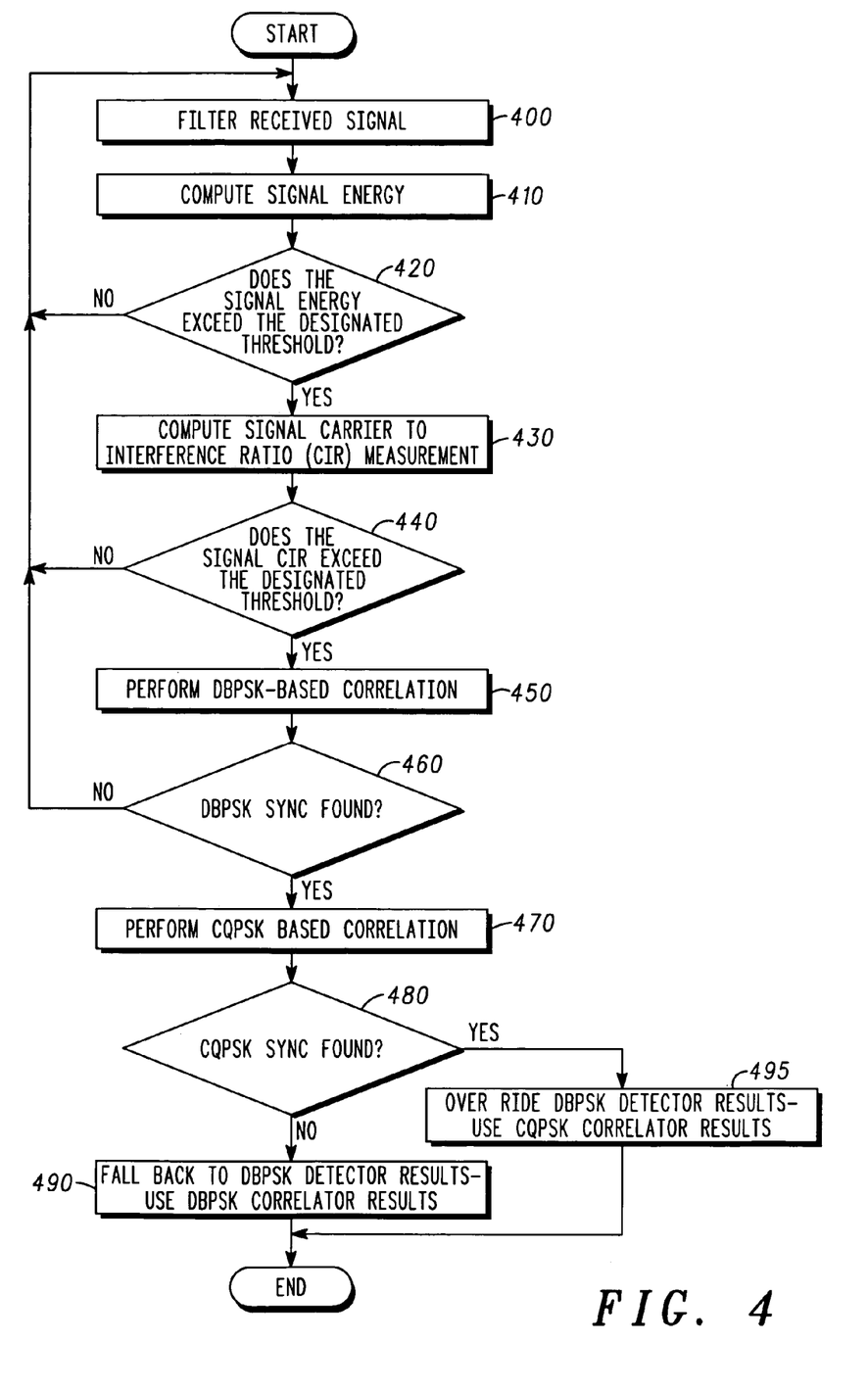
FIG. 4 is a flow chart illustrating a burst acquisition process according to one exemplary embodiment.

FIG. 4 illustrates a high level flow chart of a hybrid DBPSK/CQPSK burst acquisition process that may be used to reduce the falses and misses experienced by a receiver (100; FIG. 1) receiving a burst modulated RF signal (200) according to one exemplary embodiment. Typically, a burst detection process takes place that identifies potential valid received bursts based on data independent signal properties. The burst detection process may be performed according to any one of the exemplary embodiments further described below (e.g., as in steps 410-440 or FIG. 5). Once a burst has been detected, a sync word (or bitstream) correlation process typically takes place, in which the exact location of the sync word is found such that the data transmission is validated and synchronized. Note that the correlation could be performed with higher implementation cost directly on the received signal stream (typically at an oversampled rate), though the correlation is still typically performed for a particular modulation type (e.g., BPSK or QPSK).

As shown in FIG. 4, the overall burst acquisition method typically begins by filtering the received signal (step 400). Note that filtering of the signal is a typical step in traditional receivers, and does not have to be considered as part of the described method and apparatus, but is shown here for completeness. Also note that the particular detection means, whether through differential or coherent detection of the received signal do not alter the spirit of the present method and apparatus, which is to combine the results of at least two different detection means to improve receiver performance. After the received signal has been filtered (step 400), the signal energy is computed by the receiver (step 410) and a determination is made whether the received signal energy exceeds a designated threshold (step 420). If the received signal energy does not exceed a designated threshold value (NO, step 420), the process begins again with another newly received signal. Typically, this part of the burst detection process is performed continually on the channel, or when burst transmissions might occur (e.g., not necessarily during sleep modes). If, however, the received signal energy does exceed a designated threshold value, (YES, step 420), the receiver (100; FIG. 1) computes a signal carrier to noise plus interference ratio (CIR) measurement (step 430) and compares it to a designated threshold value (step 440). If the measured CIR value does not exceed a designated threshold value (NO, step 440), the process begins again with another received signal. If, however, the measured CIR value does exceed a designated threshold value (YES, step 440), a hybrid sync word detection process is employed. Note that hysteresis and persistence measures may also be employed during burst detection process described above. These measures are further described in the sections hereafter.

The hybrid sync word detection process in one exemplary embodiment of the present method and apparatus involves performing a DBPSK correlation on the received signal (step 450). If a valid sync word is not found through DBPSK detection and correlation (NO, step 460), the process begins again with a new received signal on the next (potentially) detected burst. If, however, a valid sync word is found (YES, step 460), a second sync word detection and correlation process is performed on the received signal utilizing CQPSK demodulation (step 470). If the CQPSK correlation results in a sync word being found (YES, step 480), the DBPSK correlation results are overridden or superseded, and the CQPSK correlator results are used to synchronize the received data burst (step 495). If, however, the CQPSK correlation does not result in the sync word being found (NO, step 480), the receiver (100; FIG. 1) will revert back to the BPSK detector results (if any) and use the DBPSK correlator results (step 490) for demodulation. Further details of each step illustrated in the method of FIG. 4 will now be given below in further detail.

Burst acquisition in each active demodulator channel of the receiver (100; FIG. 1) is controlled by several signal processing/estimation blocks, and is divided into two main components: burst detection (steps 400-440) and unique (sync) word searching (e.g., demodulation) (steps 450-495) as shown in FIG. 4. The burst detection circuitry is first responsible for identifying likely QPSK signals on the channel (with only a very coarse timing resolution of several symbols), and sync word acquisition is then responsible for finding the exact location (and burst/frame timing) of the packet. Additionally, the processes are sequential: sync word searches will only be performed once a probable burst is detected. Therefore, the probabilities of falsing and missing data packets (300; FIG. 3) are greatly affected by both the burst detection process and the sync word search.

Burst Detection

Figure 5:
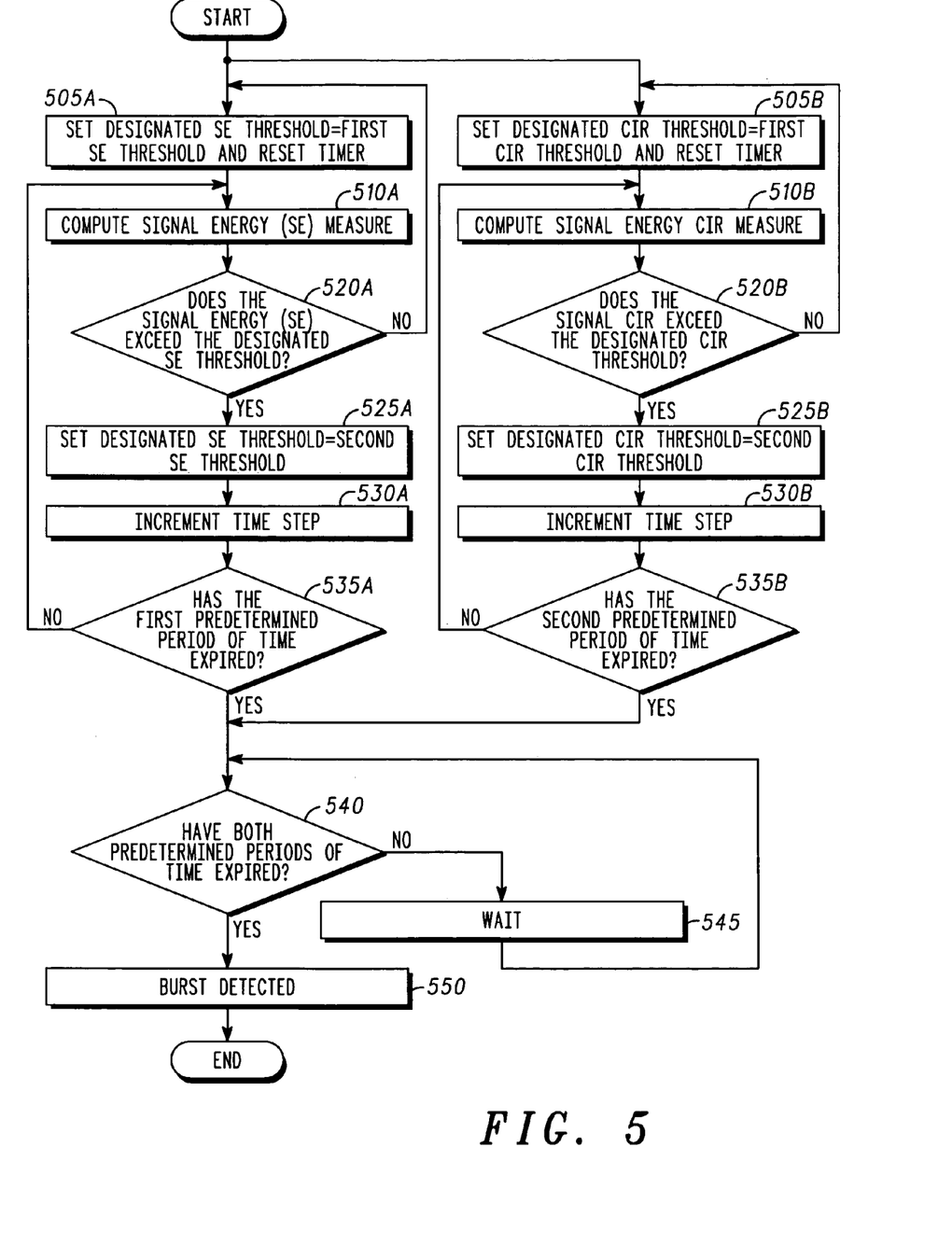
FIG. 5 is a flow chart illustrating a multi-step burst detection process according to one exemplary embodiment.

As shown in the exemplary embodiment of FIG. 4, after excess noise is filtered from a received signal (step 400), a received (in-band on-channel) signal energy test is performed (steps 410, 420), which is further qualified by a received signal (data independent) carrier to noise plus interference ratio (CIR) test (steps 430, 440). Note that noise can be considered a form of interference, and the carrier to noise plus interference ratio can be traditionally estimated by calculating the deviation from an ideal signal constellation, as is known to those skilled in the art. For the purposes of the following discussion, the "noise plus interference" term is hereafter referred to only as an "interference" term, with no loss of generality. According to one exemplary embodiment, both the signal energy measurements and CIR measurements are required to pass programmable thresholds to coarsely indicate (in time) the potential presence of a burst transmission. Note that these designated thresholds may differ depending on whether a signal is currently being detected or not. For example, a first threshold may be utilized at start-up when no signal has been detected, and a second threshold may be utilized after a signal has been detected, in order to avoid false drop-outs of the detectors. The individual second thresholds for each detector are typically set to be slightly lower than the respective first thresholds. This technique increases the noise and interference immunity of both the signal energy and CIR detectors. Note that the signal energy detector and CIR detector will typically utilize different designated thresholds (both first and second thresholds). Additionally, both measurements may be required to be sustained for a predetermined amount of time to further qualify as a valid burst, as illustrated in FIG. 5 and further described below. Note that the signal energy and signal CIR may be required to be sustained for different periods of time (i.e., a first and second predetermined period of time, respectively) to be considered a valid burst. Typically, this time period is set to comprise a majority of the normal burst transmission time (e.g., ¾ of the burst), and is proportional to the minimum amount of required valid data in the burst (before any error correction). This signal persistence measure helps identify (and invalidate) data bursts that become corrupted by interfering signals before the completion of the desired burst.

If the received signal exceeds the designated signal energy threshold values (YES, step 420), a CIR test is performed on the received signal (step 430). According to one exemplary embodiment, a CIR or a signal, noise, and distortion (SINAD) estimate is performed (step 430) continuously for each demodulator channel. Similar to the continuous signal energy estimate described above, programmable thresholds are utilized with hysteresis to detect noisy signals. According to one exemplary embodiment, any signal with a 4-point phase constellation (QPSK or sine wave tone, since they are identical) will be detected as a potential burst. The signal, noise, and distortion (SINAD) estimate is typically computed in a higher order filter (with frequency offset compensation) (not shown) and corresponds roughly to the QPSK signal's CIR. When this measurement passes a threshold, a signal flag is set (YES, step 440), and if burst energy is also present, a burst is said to have been detected. The CIR thresholds should typically be set to the minimum expected system operating CIR or SINAD ratio. The rest of the hybrid sync algorithm (steps 450-495) is described in detail in the "Sync Word Searching" section below.

FIG. 5 is a flow chart illustrating an alternative multi-step burst detection process aimed at reducing misses and falses according to one exemplary embodiment. According to the alternative exemplary embodiment illustrated in FIG. 5, the first measurement performed is a computation of signal energy (step 510*a*). There are many methods for computing signal energy which are well known in the art. Most of these methods involve a sum-of-squares operation to determine a quantity that is proportional to signal energy. According to this exemplary embodiment, a potentially recoverable burst (300; FIG. 3) is identified when the signal energy in the channel bandwidth exceeds a minimum (first designated) threshold (YES, step 520*a*). The minimum threshold value may be determined by a maximum available gain threshold register settings. Once this signal energy level is exceeded, the signal energy detector preferably switches to a second signal energy threshold (525*a*), which is set to be lower than the first threshold. If the signal energy falls below the second threshold, the detector switches back to the first threshold (and indicates a signal drop-out, thus invalidating the burst if the first predetermined period of time has not expired). This method is employed in a similar manner in the CIR detector (though with different first and second thresholds, and possibly a different predetermined period of time). According to one exemplary embodiment, when computing signal energy (step 510*a*) the signal energy on each channel is monitored continuously. Additionally, hysteresis as described above is employed on these and other estimator signal detection settings (e.g., CIR), since the estimates will vary based on noise and interference levels. Generally, first (upper) and second (lower) thresholds are provided (and are fully programmable) for burst detection, which allows for variation in the signal energy and CIR estimator outputs, without unnecessarily invalidating actual noisy bursts. The hysteresis will allow the detectors to pull-in valid signals and hold the indicators during noise events (continuous or impulse). Generally, the upper signal energy threshold is set just below the minimum expected absolute signal level, and the lower energy threshold is set 1-3 dB below that level. Note that the designated thresholds for both detectors (i.e., signal energy and CIR) could also be made adaptable to current or measured channel conditions, or other operating parameters.

As shown in FIG. 5, the multi-step burst detection process may begin by simultaneously setting a designated signal energy threshold equal to a first signal energy threshold and resetting a timer (step 505*a*) and setting a designated CIR threshold equal to a first CIR threshold and resetting a timer (step 505*b*). Once both the thresholds are set, the system computes both a signal energy (SE) measurement (step 410*a*) and a signal CIR measurement (step 510*b*). These measurements are then compared to the above-mentioned first SE and CIR thresholds (step 520*a*, 520*b*). If either of the first thresholds are not exceeded, the timer and the thresholds are reset and the process begins again. If, however, the thresholds are exceeded (YES, step 520*a*, 520*b*), the thresholds are equated with a second set of SE and CIR thresholds (steps 525*a*, 525*b*) and a time step is incremented (steps 530*a*, 530*b*). If the SE and CIR thresholds are exceeded both individually (YES, steps 535*a* and 535*b*), and collectively (YES, step 540) for designated periods of time, a burst is detected (step 550) and a hybrid lower order and higher order modulation sync word search may be performed as illustrated below. If, however, both the SE and CIR thresholds have not been exceeded collectively (NO, step 540), the system will wait for such an indication (step 545).

Typically, successful burst detection (or the detection of a potential valid received burst) indicates a coarse search window that a sync word search algorithm needs to examine. For instance, burst detection may indicate that a received burst begins within N symbols of the detected location (when both the signal energy and signal quality exceeded programmable thresholds). Typically, burst detection is only accurate to within some number of symbols (e.g., N=2-40), so sync word detection and correlation means must be utilized to find the exact location of the sync word and subsequent burst (or frame) timing. The sync word correlator is responsible for searching the entire search window for a valid sync word. If a valid sync word is not found, the burst detection means is thought to have incorrectly indicated a potential burst. If the system sync word is found, the rest of the data packet or payload is demodulated with the symbol timing as determined by the sync word location, as is known in the art.

While the exemplary embodiments illustrated above mention a number of default thresholds that may be incorporated into the exemplary method illustrated in FIG. 4, any number of CIR or signal energy threshold values may be used. Moreover, variation of the above-mentioned threshold values may entail variation of additional demodulator parameters to minimize false burst detects. Demodulator parameters that may be varied include, but are no way limited to filter delay parameters that compensate for processing delays and attempts to align a burst start pointer with the approximate start of a burst.

Finally, note that according to one exemplary embodiment, the burst detection flags indicating appropriate signal energy and CIR values must remain valid for a minimum programmable time period. According to one exemplary embodiment, the minimum programmable time period is set around 200 symbols for a 242 symbol burst, and is referenced to the start of the burst. By indicating the detection of a burst after the above-mentioned conditions are met for a minimum time period, further, false burst detects which are caused by spurious transitions of the detectors during poor channel conditions (e.g., impulse noise, tone bursts, etc.) are eliminated.

When a burst is detected by the demodulator (120; FIG. 1), a pointer to the start of the burst is set by backing off the current slot buffer write pointer by an amount equal to the programmable filter delay parameter. This parameter compensates for the delay through the signal estimation filters, and attempts to align a burst_start pointer with the approximate start of the burst. According to one exemplary embodiment, the filter delay parameter accounts for any variability in burst detection triggering (based on varying levels). Decreasing this value may increase the miss rate (in situations where the demodulator does not go back far enough in time to search for the sync word) while unnecessarily increasing this value may increase the opportunities for the demodulator (120; FIG. 1) to false, since more dead time is searched prior to the actual sync word.

Moreover, a unique_word_timeout sync word search parameter or a "search window" may be included according to one exemplary embodiment. The unique_word_timeout sync word search parameter controls how far (forward in time in symbols) from the above-mentioned burst_start point that the sync word is searched out. According to one exemplary embodiment, the search window is set to around 5 times the sync word length in symbols, though if the sync word is not found in that window and the burst detector is still triggered after the demodulation process, another sync word search will begin (unique_word_timeout) forward in time from the previous search. According to this exemplary embodiment, all sync word searches stop once the first sync word location is found. While the exemplary embodiment illustrated above is described as having a particular search window size, any size search window may be incorporated into the present method and apparatus. Moreover, the search window illustrated above is a parameter that is programmable (within limits) via the unique_word_timeout register value (typically specified in symbols).

Sync Word Searching

Once the burst detection conditions are met (YES, step 440), a packet of data is demodulated (along with additional symbols accounting for timing uncertainty as described above), and hybrid correlation techniques are applied to the data signal (steps 450-495). According to one exemplary embodiment illustrated in FIG. 4, the hybrid correlation process includes performing both a differential BPSK and coherent QPSK correlation on the demodulated data to improve receiver miss and false rate performance. The hybrid correlation techniques (steps 450-495) of FIG. 4 are described in detail below.

When a burst is detected and remains valid for the specified time period (YES, step 440) as described above, the demodulator (120; FIG. 1) will typically estimate the symbol timing, phase and frequency offset of the signal. Then a hybrid sync word search method (steps 450-495) will be performed on the received signal. According to the exemplary embodiment illustrated in FIG. 4, a hybrid DBPSK/CQPSK search method is employed in the demodulator (120; FIG. 1) to achieve the best overall acquisition performance by combining the most desirable (miss rate and false rate) aspects of each detection approach. Accordingly, once the above-mentioned burst detection process (e.g., steps 400-440) is performed on the received signal, both a DBPSK sync word detection and correlation search process (step 450) and a coherent QPSK sync word detection and correlation process (step 470) are performed over a programmable search window.

During the sync or unique word search, one overall goal is to align the sync search window as late as possible in order to reduce the chances of falsing during sync word searches, as further described theoretically below. Accordingly, the first stage of the hybrid sync word search involves performing a differential (frequency corrected) BPSK sync word search (step 450) on the received signal (since the unique word is actually a BPSK symbol stream). Note, however, that these techniques can also be applied to systems where only part of the sync word contains lower order modulation. The DBPSK sync word search is first performed (step 450) on the received signal since the DBPSK detector requires low processing complexity and has excellent sensitivity, which reduces the miss rate, as shown theoretically below. In fact, a DBPSK detector has approximately a 1.5-2 dB sensitivity performance improvement over a coherent QPSK detector, which typically corresponds to 1-2 orders of magnitude in BER reduction at 14.5 dB signal to noise ratio (SNR). The increase in sensitivity is due to the fact that binary symbol decision regions are utilized instead of quaternary decision regions. Thus, according to one exemplary embodiment, a differential BPSK detector is chosen due to its low implementation complexity and good performance when compared to a coherent BPSK detector which would be more difficult to train on QPSK data modulation.

However, one drawback of the BPSK sync word detection (step 450) is its relatively poor falsing rate, even when set to a perfect match of the sync word, due primarily to the short unique word sequence (of 13 DBPSK symbols after differential decoding in the DVS178 system example). This perfect sync word match scenario sets an upper bound on the raw BPSK falsing performance (per symbol) for random noise inputs as shown in Equation 1 below:

$$Pr[DBPSK\ false] = 2^{-L} = 1.22 \times 10^{-4}, \text{ where } L = DBPSK \text{ sync word length} \quad (1)$$

Note that this and subsequent analysis assume that bit decisions are independent (i.e., uncorrelated) from symbol to symbol. Due primarily to the short sync word, the DBPSK sync word must match perfectly to pass the BPSK portion of the sync word search process in the demodulator (120; FIG. 1). Additionally, noise squelching may be provided during the search according to one exemplary embodiment further described below. Without additional squelching measures, the probability of falsing (given above per symbol) would be approximately $9.77 \times 10^{-3}$ for the full 80 symbol search window.

Related to the falsing rate calculation above, the expected miss rates for the differential BPSK correlator can be found for varying (programmable) unique_word threshold levels. Under typical operation, the DBPSK correlator's threshold is set as a perfect match (which also lowers its falsing rate). A miss is traditionally encountered when a bit error occurs in the sync word bitstream correlation (though it can also occur if burst detection is not operating correctly and fails to properly detect a burst). This analysis considers only the effects of errors in the sync word, and is a function of the SNR (BER) on the channel, in addition to programmable threshold values.

The miss rate for one example of a differential BPSK sync word detector is straightforward due to the perfect match being required, and is equal to the probability of one or more bit errors in the sync word as shown in Equation 2:

$$Pr[DBPSK\text{ miss}|BER_{DBPSK}]=1-(1-BER_{DBPSK})^L \quad (2)$$

Note that the BER for the DBPSK detector is roughly two orders of magnitude (~2 dB) lower than that of a differentially coherent QPSK detector, illustrated below, at the signal to noise levels of interest (~14.5 dB SNR for the DVS178 system), and already takes into account differential decoding effects, such that only L symbols (and not L+1 symbols) need to be considered in the computation. Thus, while the fully coherent QPSK detector may have a BER of $3 \times 10^{-6}$ for 14.5 dB SNRs, the DBPSK detector's error rate will be around $6 \times 10^{-8}$, resulting in a much lower miss rate (even for a required perfect BPSK sync word match). Also note that according to one exemplary embodiment, the unique_word control register may set the BPSK unique_word threshold to a 9/3 (variable part/fixed part) match, which would improve its miss rate performance in poor channel conditions.

As shown above, the basic DBPSK correlator's falsing performance is relatively poor while the raw falsing performance of the QPSK correlator, shown below, is fairly good. However, the BPSK correlator does provide a very significant miss rate (i.e., sync word detection) performance benefit, so it is still utilized in the present hybrid burst acquisition method.

If during the DBPSK correlation (step 450), the DBPSK correlator fails to find the sync word at all (NO, step 460), no other enhancements are possible and the QPSK correlator would not likely find the sync word. It is possible to perform the QPSK correlation step anyway though, and utilize its results, if any. Consequently, the process begins again by filtering another received signal (step 400). Normally, the filtering and burst detection process is a continual process.

If, however, the DBPSK correlator does find the sync word (YES, step 460) during the DBPSK correlation (step 450), an additional QPSK sync word verification stage is normally performed (step 470) on the received signal to compensate for the relatively poor falsing performance of the DBPSK correlator.

Similar to the DBPSK detector, the coherent QPSK detector used to perform the CQPSK correlation (step 470) will have a false rate based on the sync word length for random noise. According to one exemplary embodiment, coherent sync word decoding is utilized rather than differential decoding because differential decoding could mask phase rotations mid-sync word for lower matching thresholds, and hinder falsing performance. Therefore, all four possible rotations of the sync word are coherently searched out. Also, the QPSK correlator includes a fixed portion in one embodiment (that includes the key phase transition at the end of the unique word, which is the only thing that distinguishes the sync word from a bursted sine wave for the DVS 178 system), and a variable portion for the remainder of the sync word. According to one exemplary embodiment, the fixed portion of the sync word correlation (programmable to be either the last 3 or 4 symbols of the unique word) should match exactly, while the rest of the variable portion should match at least n out of m bits (where n=unique_word_threshold and m=28−(6 or 8)). Given this information, one can calculate the raw expected miss and false rates for the QPSK correlator at the typical operating points (without the benefit of squelch).

Figure 6:
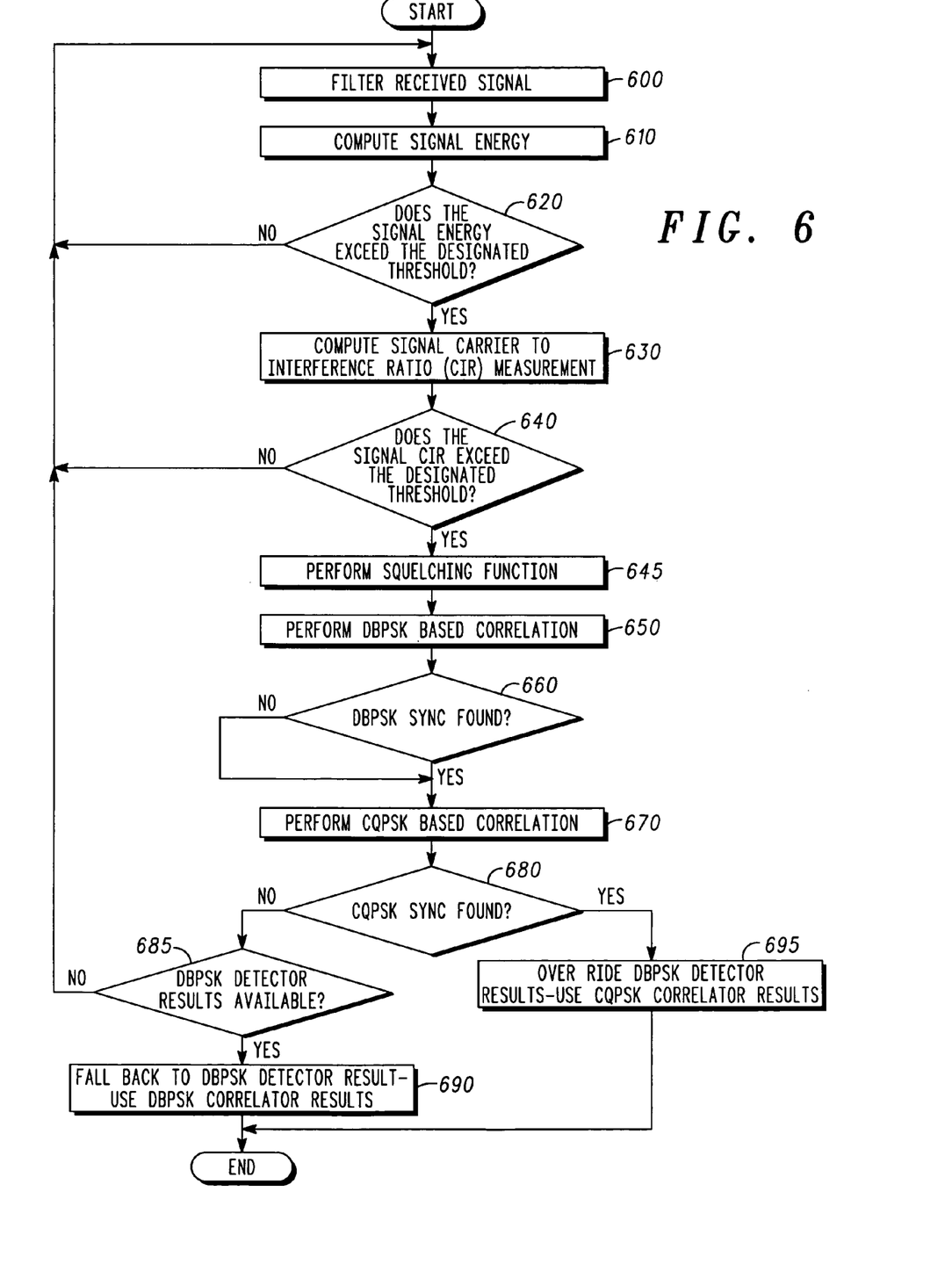
FIG. 6 is a flow chart illustrating a burst acquisition method according to one exemplary embodiment.

The miss rates of the QPSK correlator depend on the SNR (BER levels), and the falsing rates depend on the sync word length and programmable unique word threshold levels. Note that the coherent QPSK BER is typically ½ of the reported (DQPSK) BER from the demodulator (120; FIG. 1) (at reasonably high SNRs), since differential decoding is utilized for data demodulation. The probability of passing the fixed portion of the QPSK correlation is straightforward, and probability of passing the variable portion can be viewed as a binomial random variable (utilizing Bernoulli trials, which are also assumed to be independent). QPSK sync word detection is passed (YES, step 680) only when both conditions are met.

For coherent QPSK correlations on a K-bit sync word and typical t/f (variable and fixed part UW thresholds) programmable settings, the following falsing rates can be computed according to Equation 3 below:

$$Pr[QPSK\text{ false}|t/f] = 2^{(2-f)} * \sum_{i=t}^{K-f} \binom{K-f}{i} * 2^{-(K-f)}, \quad (3)$$

where $f$ = fixed part lenght, and $t$ = UW threshold

Note that (*) in the above equation is a basic combinatorial operation, which accounts for the fact that some variable number of bits (=K−f−t=28−f−t) do not have to match the sync word to pass the threshold (and thereby cause a false detect).

Thus, for a 21 variable part QPSK UW threshold with a fixed part of 6-bits (programmed as 21/0 in the unique_word control register):

$$Pr[QPSK\text{ false}|21/6]=3.43\times10^{-7}\text{ (per symbol)} \quad (4)$$

And for a 22 variable QPSK threshold with a fixed part of 6-bits (programmed as 22/0):

$$Pr[QPSK\text{ false}|22/6]=1.49\times10^{-8}\text{ (per symbol)} \quad (5)$$

While these probabilities may seem low, they are encountered every symbol period when the demodulator is actively searching for the sync word (after a burst has been detected).

Related to the falsing rate calculations above, the expected miss rate for the coherent QPSK correlator can be found for varying (programmable) unique_word threshold levels. The QPSK correlator's threshold is programmable and typically set to a 22 or 21 match value (i.e., a perfect match or a match with one or no bit errors). A miss is traditionally encountered when a bit error occurs in the sync word correlation (though it can also occur if burst detection is not operating properly). As above, this analysis considers only the effects of errors in the sync word, and is a function of the SNR (BER) on the channel, in addition to programmable threshold values.

For a given set of QPSK unique_word thresholds, and using expected coherent QPSK BER rates, the miss rate for a K-bit sync word can be computed in parts (due to the fixed and variable correlation parts) as follows:

$$Pr[QPSK\text{ miss}|BER_{CQPSK}, t/f] = 1 - \quad (6)$$
$$\left[(1-BER_{CQPSK})^f * \sum_{i=0}^{V-t} \binom{V}{V-i}(BER_{CQPSK})^i(1-BER_{CQPSK})^{(V-i)}\right],$$

where $V = (K-f) = 28 - f$

Recall again that (*) is a combinatorial operation, the coherent QPSK BER is about ½ of the differentially decoded coherently detected QPSK BER (especially for low error rates), and that t/f are the programmable variable QPSK UW threshold and fixed part correlation lengths, respectively. Note that the above equation is dominated by the fixed part correlation probability (the leftmost term in brackets) when the variable threshold is set to less than maximum, as expected. Also note that all of the miss rate equations are proportional to the expected bit error rate, which can vary somewhat.

Using the above equations, and a nominal operating differentially decoded coherently detected QPSK BER of around $6 \times 10^{-6}$ at a 14.5 dB SNR (for worst case input levels of $-10$ dBmV in one embodiment of the DVS178 system), one can compute the following miss rates for the two correlators.

$$Pr[DBPSK\ miss|BER_{DBPSK}=6\times10^{-8}]=7.8\times10^{-7} \tag{7}$$

$$Pr[CQPSK\ miss|BER_{CBPSK}=3\times10^{-6}\ t/f=21/6]=1.8\times 10^{-5} \tag{8}$$

$$Pr[CQPSK\ miss|BER_{CBPSK}=3\times10^{-6}\ t/f=22/6]=8.4\times 10^{-5} \tag{9}$$

Thus, the miss rate performance of the DBPSK detector is much better than the CQPSK detector, due primarily to its vastly decreased BER (improved sensitivity), and also in part due to the shorter sync word length. Note that all of these miss rates will improve slightly with higher received signal levels, since the effects of the analog RF and digital noise floors (around $\sim$−32 dBmV levels in one example) are less pronounced for stronger signals. In any case, higher miss rate specifications may be reached by including BPSK sync word detection (step 450).

The final sync word found check occurs when the DBPSK correlator result is checked against the CQPSK correlator result (step 480). If the QPSK correlator result match the DBPSK correlator result (YES, step 480), those matching results are utilized (step 495). If the QPSK correlator's results are different, the DBPSK detector results are overridden and the CQPSK correlator results are used (step 495). In this manner, the QPSK correlator will "correct" the DBPSK correlator's results when it falses a vast majority of the time (assuming that the burst detection stage is operating well), since it searches the entire search window (even beyond where the DBPSK search ended). If the QPSK correlator misses or otherwise fails to find the sync word (NO, step 480), the more sensitive DBPSK correlator's result will be utilized (step 490), resulting in a lower likelihood of a packet miss. In this manner, the best operating characteristics (detection sensitivity and falsing rates) are obtained by the combined hybrid sync correlation method.

The method illustrated in FIG. 4 is oriented towards achieving the superior miss rate performance of a DBPSK detector, while simultaneously realizing the improved falsing rate performance of the CQPSK detector. By combining the two methods, miss rates below a miss rate of $10^{-6}$ may be achieved for typical operating conditions in the DVS178 system.

Since DBPSK correlation is performed first (step 450), followed by the CQPSK correlation verification stage (step 470), the QPSK correlation stage will correct (i.e., over-ride) a vast majority of the DBPSK correlator falses (as long as burst detection is operating satisfactorily and there is a sync word present in the search window). According to one exemplary embodiment, the only cases where the QPSK search (step 470) will not correct a DBPSK false are when it misses, or the burst detector falsed on noise or other interference, since the demodulator is committed to utilizing the DBPSK results in order to obtain good miss rate performance. Essentially, there are two primary cases where the hybrid sync word correlation method breaks down, both involving falsing: one where the DBPSK correlator falses and the QPSK detector misses (failing to correct the BPSK false, resulting in an overall false detect), and a second one where the DBPSK detector finds the correct sync word location (or falses) and the QPSK detector falses on noise thereby incorrectly modifying the sync word location. Under typical operation, the correlators will search 20-30 symbols of pre-burst noise before finding the sync word. The first case can be computed as follows over the typical 30-symbol search window (for 22/6 CQPSK thresholds in the above example):

$$Pr[CQPSK\ miss|DBPSK\ false]=Pr[DBPSK\ false] \\ *30*Pr[CQPSK\ miss]=3.1\times10^{-7} \tag{10}$$

Thus, the CQPSK detector will correct DBPSK falses in a vast majority of cases (even without the benefit of the squelching function). Note that the miss rate performance benefit of the DBPSK detector is not seen for these cases.

The probability of the second case is essentially the same as the probability of the CQPSK detector falsing over the noise before the burst, regardless of whether the DBPSK detector found sync or falsed. A similar 30 symbol search scenario results in a probability of CQPSK falsing of (for 22/6 UW thresholds and no squelching):

$$Pr[CQPSK\ false\ |30\ symbols\ searched]=Pr[CQPSK \\ false]*30=4.5\times10^{-7} \tag{11}$$

which is equivalent to about one event every 2.2M packets.

Alternative Embodiments

FIG. 6 illustrates an alternative method for improved burst acquisition in a digital receiver according to one exemplary embodiment. Similar to the method illustrated in FIG. 4, the exemplary method illustrated in FIG. 6 includes both a burst detection process (steps 600-640) and a unique sync word searching process (steps 645-695). According to one exemplary embodiment, the method illustrated in FIG. 6 performs the same burst detection process as that illustrated above with reference to FIG. 4. More specifically, the burst detection process includes filtering a received signal (step 600), computing a signal energy (step 610), comparing the computed signal energy to a threshold value (step 620), computing a CIR value (step 630), and comparing the computed CIR value to a designated CIR value (step 640). However, in contrast to the exemplary method illustrated in FIG. 4, the unique sync word searching process illustrated in FIG. 6 begins by performing a squelching function on the received signal (step 645).

In addition to the hybrid correlation techniques illustrated above, the squelching function (step 645) can be utilized to further reduce overall falsing and mis-alignment rates experienced by the correlators. The squelching function (step 645) provides additional information to the correlators by classifying each sample as likely to be a noise sample or a signal sample. This is especially useful for the DBPSK correlator, though it can also be of benefit to the QPSK correlator (by lowering the mis-alignment probability even more). The addition of performing the squelching function to the present method should lower all of the falsing probabilities significantly (by an order of magnitude or more for most cases), including those where a mis-alignment induces a miss. The performance of the squelching function (step 645) will be described in detail below.

During performance of the squelching function (step 645), a squelch estimator classifies each phase sample as likely being noise or signal. This information is utilized in the correlation stages of the receiver (100; FIG. 1) to lower or eliminate falsing issues during correlation. Recall that the demodulator typically operates on phase samples to reduce implementation complexity. The actual squelch match thresholds (n) are programmed separately for the BPSK and QPSK correlators and may include a wide range of values. According to one exemplary embodiment, a squelch match threshold of 10 (out of 14) is utilized for both the DBPSK and QPSK correlators.

Performance of the squelching function (step 645) mutes noise samples in the BPSK/QPSK correlation stages of demodulation thereby reducing falsing. For normalized Gaussian input noise with a given variance (or noise power $\sigma^2 = 1$ for each channel), the absolute summing of the channels (|I|+|Q|) will result in a new random variable with the following probability density function (pdf):

$$p(y) = \frac{2}{\sqrt{\pi}} \text{erf}\left(\frac{y}{2}\right) * \exp\left(\frac{-y^2}{4}\right) \quad (12)$$

The probability density function illustrated in Equation 12 is normalized for unit variance noise signals, and can be integrated from the chosen squelch threshold value (divided by the square root of the actual noise variance or noise power) to infinity in order to obtain the probability that the absolute sum (|I|+|Q|) will cross the programmed squelch threshold value:

$$psp = Pr[\text{squelch passed} \,|\, st/\sigma] \quad (13)$$
$$= \int_{st/\sigma}^{\infty} p(y)\,dy, \text{ where}$$
$$st = \text{squelch threshold}$$

Note that this probability is a function of the baseband input noise power ($\sigma^2$), which is also estimated by the signal energy estimator (and scaled down by 32 in one embodiment). Thus, a single probability can be obtained for each (noise) symbol passing squelch thresholds in the subsequent correlation processes. This can be combined with a binomial distribution to compute the probability that n out of m symbol samples pass squelch thresholds, and is a direct multiplier to the falsing probabilities given above (since the squelch decisions are independent of the signal phase). The final probability of passing overall squelch match thresholds (pns) during the correlation process (and hence utilizing the phase correlation result) is based on the above individual sample squelch probability and programmed squelch match threshold (smt) values [again using combinatorials (*) and assuming a binomial distribution with independent trials]:

$$pns = Pr[\text{corr. valid} \,|\, smt, psp] \quad (14)$$
$$= \sum_{n=smt}^{m} \binom{m}{n} * psp^i \, psp^{m-i},$$
where $m = 14$ symbols Therefore, the value (1.0-pns) represents the probability that the squelch function will be activated forcing the demodulator to ignore the phase correlation results (even if they match), since the symbol sequence was deemed to be based on noise samples. Thus, this value will directly modify (i.e., multiply) the falsing probability for each of the detectors as long as the processes are independent. Note the squelch match thresholds can be set very high to help avoid falsing on even strong noise cases. This property could be utilized to dynamically adapt the squelch match thresholds in the receiver based on the estimated signal energy of the burst (since all of the required quantities are available by the time of the demodulation correlation stage). Also note that the performance of the squelching function (step 645) can improve receiver (100; FIG. 1) performance in cases where the burst detection stage falses on ingress noise (since it will lower DBPSK correlator falses). According to one exemplary embodiment, the squelch threshold is set anywhere from roughly 3-7 dB below the weakest expected signal levels, and varies in conjunction with the chosen squelch match threshold settings.

Once the squelch function is performed (step 645), a DBPSK correlation is performed (step 650). If a DBPSK sync is found (YES, step 660), a CQPSK correlation is also performed (step 670). Moreover, in contrast to the method illustrated in FIG. 4, if the DBPSK sync is not found (NO, step 660), a CQPSK correlation is performed anyway (step 670). Upon completion of the CQPSK correlation (step 670), the demodulator (120; FIG. 1) determines whether the CQPSK sync was found (step 680). If the CQPSK sync was found (YES, step 680), the CQPSK detector results are used (step 695). If, however, the CQPSK sync was not found (NO, step 680), a determination is made whether DBPSK results are available (step 685). If DBPSK results are available (YES, step 685), the demodulator (120; FIG. 1) uses the DBPSK correlator results (step 690). If, however, there are no DBPSK detector results (NO, step 685), the process begins again with a newly received signal.

In conclusion, the present method and system for obtaining improved burst acquisition in a digital receiver uses the beneficial aspects of both a QPSK burst correlator and a BPSK burst correlator to effectively reduce both falses and misses occurring in a demodulator. A multi-step burst detection process is also preferably employed first as part of the overall burst acquisition process. All of the above-mentioned enhancements to the correlators may be made with low implementation cost architectures resulting in minimal cost increase in the production of the overall receiver. Moreover, the present methods and system do not significantly increase the current drain experienced by the receiver. Additionally, the present exemplary methods and systems may be performed on either fixed or variable payload burst packets.

The preceding description has been presented only to illustrate and describe the present method and system. It is not intended to be exhaustive or to limit the present method and system to any precise form disclosed. Many modifications and variations are possible in light of the above teaching. The above burst acquisition processes can be equally applied to non-bursted communications systems, such as those systems employing Time Division Multiplexing (TDM) or Time Division Multiple Access (TDMA) techniques.

The foregoing embodiments were chosen and described in order to illustrate principles of the method and system as well as some practical applications. The preceding description enables others skilled in the art to utilize the method and system in various embodiments and with various modifications as are suited to the particular use contemplated. It is intended that the scope of the method and system be defined by the following claims.

What is claimed is:

1. A method for improving burst acquisition in a digital communication device comprising:
   receiving a signal; and
   performing a lower order detection process including a lower order modulation detection and correlation on a portion of said received signal, wherein said lower order process produces a lower order synchronization word indication result and a lower order synchronization word timing result;

performing a higher order detection process including a higher order modulation detection and correlation on said portion of said received signal, wherein said higher order detection process produces a higher order synchronization word indication result and a higher order synchronization word timing result, said higher order detection process being performed when said lower order synchronization word indication result is present; and modifying said synchronization word timing result to be said lower order synchronization word timing result when said higher order synchronization word indication is absent, and to be said higher order synchronization word timing result when said higher order synchronization word indication is present.

2. The method of claim 1, wherein said lower order detection process comprises performing a biphase shift keying (BPSK) sync word correlation process.

3. The method of claim 1, wherein said higher order detection process comprises performing a quadrature phase shift keying (QPSK) sync word correlation process.

4. The method of claim 1, wherein the step of modifying includes using said result of said higher order detection process to modify said one or more detection thresholds of said lower order detection process.

5. The method of claim 1, wherein if said result from said higher order detection process comprises a CQPSK sync word result, using said CQPSK sync word correlation result to demodulate said burst.

6. The method of claim 1, further comprising performing said lower order detection process prior to said higher order detection process.

7. The method of claim 1, further comprising performing a squelching function on said received signal prior to said sync word search.

8. The method of claim 1, wherein said sync word search is not performed until a multi-step burst detection process detects a burst.

9. A method for improving burst detection in a digital receiver device, comprising:

receiving a signal; and performing a multiple persistent burst detection process on said signal;

wherein the multiple persistent detection process further comprises:

estimating a signal energy value over a portion of said signal;

comparing said signal energy value to a designated signal energy threshold value;

estimating a signal carrier to noise plus interference ratio (CIR) value over the same portion of said signal;

comparing said CIR value to a predetermined CIR threshold value; and signaling a valid burst detection if said signal energy value exceeds said predetermined signal energy threshold value for a first predetermined period of time and said CIR value simultaneously exceeds said predetermined CIR threshold value for a second predetermined period of time, wherein said first predetermined period of time and said second predetermined period of time comprise a majority of an expected burst duration, wherein said predetermined signal energy threshold value comprises a first signal energy threshold that is utilized to detect a presence of said signal if said signal is currently undetected, and a second signal energy threshold that is utilized to detect the absence of said signal if said signal is currently detected, said signal being initially detected if the estimated signal energy exceeds said first signal energy threshold, and said signal becoming subsequently undetected if the estimated signal energy falls below said second signal energy threshold.

10. A method for improving burst detection in a digital receiver device, comprising:

receiving a signal; and performing a multiple persistent burst detection process on said signal;

wherein the multiple persistent detection process further comprises:

estimating a signal energy value over a portion of said signal;

comparing said signal energy value to a designated signal energy threshold value;

estimating a signal carrier to noise plus interference ratio (CIR) value over the same portion of said signal;

comparing said CIR value to a predetermined CIR threshold value; and signaling a valid burst detection if said signal energy value exceeds said predetermined signal energy threshold value for a first predetermined period of time and said CIR value simultaneously exceeds said predetermined CIR threshold value for a second predetermined period of time, wherein said first predetermined period of time and said second predetermined period of time comprise a majority of an expected burst duration, wherein said predetermined CIR threshold value comprises a first CIR threshold that is utilized to detect the presence of said signal if said signal is currently undetected, and a second CIR threshold that is utilized to detect the absence of said signal if said signal is currently detected, said signal being initially detected if the estimated signal CIR exceeds said first CIR threshold, and said signal becoming subsequently undetected if the estimated signal CIR falls below said second CIR threshold.

11. A digital communications system comprising:

a tuner; and a demodulator;

wherein said demodulator is configured to receive a signal and perform a lower order detection process including a lower order modulation detection and correlation on a portion of said received signal, wherein said lower order process produces a lower order synchronization word indication result and a lower order synchronization word timing result;

selectively performing a higher order detection process including a higher order modulation detection and correlation on said portion of said received signal, wherein said higher order detection process produces a higher order synchronization word indication result and a higher order synchronization word timing result, said higher order detection process being performed when said lower order synchronization word indication result is present; and modifying said synchronization word timing result to be said lower order synchronization word timing result when said higher order synchronization word indication is absent, and to be said higher order synchronization word timing result when said higher order synchronization word indication is present.

12. The digital communications system of claim 11, wherein said lower order detection process comprises a biphase shift keying (BPSK) sync word correlation process and said higher order detection process comprises a quadrature phase shift keying (QPSK) sync word correlation process.

13. The digital communications system of claim 11, wherein said demodulator is further configured to perform said lower order detection process prior to said higher order detection process.

14. The digital communications system of claim 11, wherein said demodulator is further configured to perform a squelching function on said received signal prior to said sync word search.

15. The digital communications system of claim 11, wherein said demodulator is further configured to perform said sync words search only after a multi-step burst detection process detects a burst.

16. A digital communications system comprising:
a tuner; and
a demodulator; wherein said demodulator is configured to receive a signal and perform a multiple persistent burst detection process on said received signal wherein the multiple persistent burst detection process further comprises:
estimating a signal energy value over a portion of said signal;
comparing said signal energy value to a programmable signal energy threshold value;
estimating a signal carrier to noise plus interference ratio (CIR) value over the same portion of said signal;
comparing said CIR value to a predetermined CIR threshold value; and
signaling a valid burst detection if said signal energy value exceeds said predetermined signal energy threshold value for a first predetermined period of time and said CIR value simultaneously exceeds said predetermined CIR threshold value for a second predetermined period of time, wherein said first predetermined period of time and said second predetermined period of time comprise a majority of an expected burst duration,
wherein said predetermined signal energy threshold value comprises a first signal energy threshold that is utilized to detect a presence of said signal if said signal is currently undetected, and a second signal energy threshold that is utilized to detect the absence of said signal if said signal is currently detected, said signal being initially detected if the estimated signal energy exceeds said first signal energy threshold, and said signal becoming subsequently undetected if the estimated signal energy falls below said second signal energy threshold.

17. A digital communications system comprising:
a tuner; and
a demodulator; wherein said demodulator is configured to receive a signal and perform a multiple persistent burst detection process on said received signal wherein the multiple persistent burst detection process further comprises:
estimating a signal energy value over a portion of said signal;
comparing said signal energy value to a programmable signal energy threshold value;
estimating a signal carrier to noise plus interference ratio (CIR) value over the same portion of said signal;
comparing said CIR value to a predetermined CIR threshold value; and signaling a valid burst detection if said signal energy value exceeds said predetermined signal energy threshold value for a first predetermined period of time and said CIR value simultaneously exceeds said predetermined CIR threshold value for a second predetermined period of time, wherein said first predetermined period of time and said second predetermined period of time comprise a majority of an expected burst duration,
wherein said predetermined CIR threshold value comprises a first CIR threshold that is utilized to detect the presence of said signal if said signal is currently undetected, and a second CIR threshold that is utilized to detect the absence of said signal if said signal is currently detected, said signal being initially detected if the estimated signal CIR exceeds said first CIR threshold, and said signal becoming subsequently undetected if the estimated signal CIR falls below said second CIR threshold.

18. The digital communications system of claim 16, wherein said system comprises a digital receiver.

* * * * *